Feb. 22, 1966   A. CHARPILLOZ   3,236,042
BALANCE-STAFF WITH A COLLET FOR FIXING THE INNER
END OF A BALANCE-SPRING IN A TIMEPIECE
Filed Dec. 4, 1964

INVENTOR.
Arnold Charpilloz
BY
*Imisie & Smiley*
ATTYS.

3,236,042
BALANCE-STAFF WITH A COLLET FOR FIXING THE INNER END OF A BALANCE-SPRING IN A TIMEPIECE
Arnold Charpilloz, Bevilard, Switzerland
Filed Dec. 4, 1964, Ser. No. 415,945
Claims priority, application Switzerland, May 29, 1964, 7,040/64
5 Claims. (Cl. 58—115)

The present invention relates to a balance-staff with a collet for fixing the inner end of a balance-spring in a timepiece, which is characterized in that the collet consists of a radially split ring to be partially engaged into a recess provided in an enlarged portion of the balance-staff, said ring having from one of its faces three bearing surfaces of increasing diameter, the diameters of said bearing surfaces and of said recess being such that the collet, when it is introduced with its first bearing surface into said recess, permits inserting the balance-spring into said radial split at the level of the third bearing surface of the collet and that, when it is introduced with its second bearing surface into said recess, it is radially contracted and holds the balance-spring in place.

The accompanying drawing shows, by way of example, one embodiment of the invention.

Figure 1:
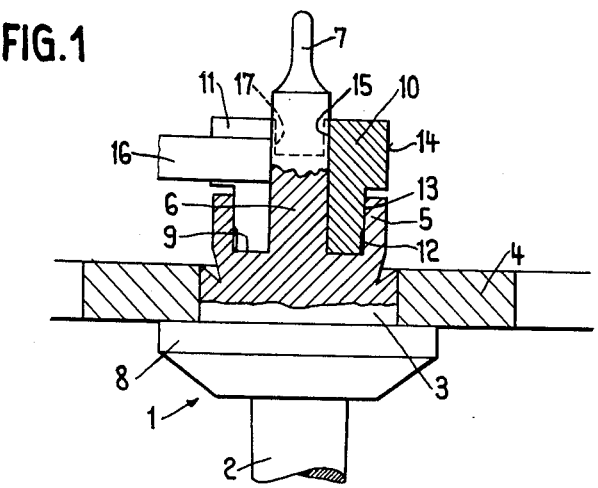
FIGURE 1 is an axial cross-sectional view of said embodiment.

The balance-staff illustrated in the drawing is denoted generally by the reference numeral 1. The balance-staff 1 has the following portions: an arbor 2, a seat 3 onto which is driven the hub 4 of the balance (not shown), an enlarged portion 5, a pivot-shank 6 and a conical pivot 7. At its lower end, not shown, the arbor 2 is also followed by a pivot-shank and a conical pivot. The arbor 2 and the seat 3 are interconnected by an intermediate portion 8 consisting of a frustoconical portion and a cylindrical portion. The enlarged portion 5 of the balance-staff 1 has on its upper face a recess 9 adapted to receive a collet described later on.

The collet consists of a ring 10 provided with a radial split 11. The ring 10 has, from its lower face, three bearing surfaces 12, 13 and 14 of increasing diameter. The diameter of the bearing surface 12 is scarcely greater than that of the recess 9, whereas the diameter of the pivot-shank 6 is somewhat smaller than that of the hole 15 of the collet 10. The width of the radial split 11 is slightly greater than the thickness of the balance-spring 16.

The sum of the heights of the first two bearing surfaces 12 and 13 of the ring 10 is slightly greater than the depth of the recess 9, and the height of the third bearing surface 14 is greater than the height of the balance-spring 16.

The ring 10 has in addition on its upper face a diametral groove 17 adapted to receive a tool by means of which the collet may be turned when the balance-spring has been put in position, as explained below.

The fixing of the inner end of the balance-spring 16 to the collet is made as follows:

The ring 10 is first inserted into the recess 9 so that its first bearing surface 12 only engages said recess 9. The collet is thus provisionally held in place, since it is slightly contracted in the radial direction. Then, the inner end of the balance-spring 16 is introduced into the radial split 11 at the level of the third bearing surface 14, the balance-spring 16 arriving in the close vicinity of the pivot-shank 6. Thereafter the collet 10 is further pushed into the recess 9, so that the second bearing surface 13 engages said recess 9. The collet is thus further contracted in the radial direction, so that the split 11 is closed and firmly holds in place the balance-spring 16. This radial contraction is rendered possible due to the fact that, as already said, the hole 15 of the ring 10 has a diameter which is larger than that of the pivot-shank 6.

Figure 2:
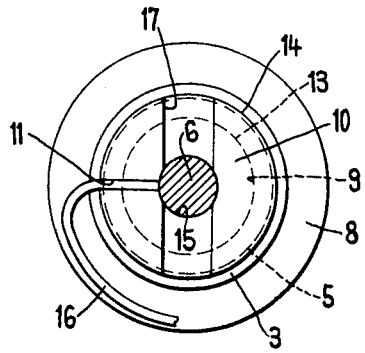
FIGURE 2 is a top plan view thereof.

FIGS. 1 and 2 show the position of the parts when the balance-spring 16 is clamped in the collet 10, the latter being engaged at the maximum in the recess 9. Although the inner end of the balance-spring 16 is firmly held in the collet 10, it is still possible to turn the collet 10 by means of a tool inserted into the groove 17, in order to put the escapement into beat.

The invention offers the advantage that it permits the realization of a collet of a small diameter with respect to that of the balance-staff, which guarantees a good concentricity of the windings of the balance-spring. In addition, it makes it possible to automatize the mounting of the balance-spring onto the balance-staff.

While I have described and illustrated one embodiment of my invention, I do not wish to unnecessarily limit the scope thereof, but reserve the right to make such modifications and rearrangements of the several parts as may come within the purview of the accompanying claims.

What I claim is:

1. A balance-staff with a collet for fixing the inner end of a balance-spring in a timepiece, characterized in that the collet consists of a radially split ring to be partially engaged into a recess provided in an enlarged portion of the balance-staff, said ring having from one of its faces three bearing surfaces of increasing diameter, the diameters of said bearing surfaces and of said recess being such that the collet, when it is introduced with its first bearing surface into said recess, permits inserting the balance-spring into said radial split at the level of the third bearing surface of the collet and that, when it is introduced with its second bearing surface into said recess, it is radially contracted and holds the balance-spring in place.

2. A balance-staff with a collet as claimed in claim 1, characterized in that the diameter of the first bearing surface of said ring is scarcely greater than that of said recess.

3. A balance-staff with a collet as claimed in claim 1, characterized in that the sum of the heights of the first two bearing surfaces of said ring is slightly greater than the depth of said recess.

4. A balance-staff with a collet as claimed in claim 1, characterized in that the height of the third bearing surface of said ring is greater than the height of the balance-spring.

5. A balance-staff with a collet as claimed in claim 1, characterized in that said ring has in addition on its upper face a diametral groove adapted to receive a tool for turning the collet after the balance-spring has been put in place, for putting the escapement into beat.

No reference cited.

LEO SMILOW, *Primary Examiner*.